United States Patent [19]

Stenling

[11] 4,212,086
[45] Jul. 8, 1980

[54] MEASURING AND RECORDING DEVICE FOR MONITORING VIBRATIONS CAUSED BY BLASTING

[75] Inventor: Lars Stenling, Märsta, Sweden

[73] Assignee: Nitro Consult AB, Sweden

[21] Appl. No.: 873,261

[22] Filed: Jan. 30, 1978

[30] Foreign Application Priority Data

Feb. 3, 1977 [SE] Sweden ............................ 7701217

[51] Int. Cl.² .......................... G01V 1/16; G01D 9/28
[52] U.S. Cl. .................................. 367/178; 346/59;
346/50
[58] Field of Search .............. 181/122; 340/15, 16 C, 340/17 R; 346/50, 59, 7, 33 C; 73/541, 558, 566, 594, 653, DIG. 1

[56] References Cited

U.S. PATENT DOCUMENTS

| 2,873,103 | 2/1959 | Hautly | 73/653 |
| 3,277,429 | 10/1966 | Hammond | 340/16 C |
| 3,599,222 | 8/1971 | Franklin et al. | 346/33 M |
| 3,605,110 | 9/1971 | Southward et al. | 346/59 |
| 3,877,296 | 4/1975 | Rihn | 73/653 |

OTHER PUBLICATIONS

Snodgrass, "Deep Sea Instrument Capsule", 10/4/68, pp. 78-87, Science, vol. 162.
Madsen et al., "The Digital Event Recorder Type 7502", 1972, pp. 16-21, Bruel & Kjaer Tech. Rev. (Denmark), #4.

Primary Examiner—Nelson Moskowitz
Attorney, Agent, or Firm—Shlesinger, Fitzsimmons & Shlesinger

[57] ABSTRACT

The device comprises a transducer for measuring mechanical vibrations, and means including an analogue/digital converter for recording on paper tape, or the like, the signals generated by the transducer whenever it detects mechanical vibrations. A regulated voltage source in the form of a battery is used to supply power to the transducer and to its recording means, but a control circuit is included which normally causes the battery to supply power only to the transducer. However, whenever vibrations cause the transducer to produce a voltage having an amplitude which exceeds a predetermined threshold value, the battery is caused to supply power also to the recording means. The battery and the paper tape are contained in a replaceable cartridge so that both the battery and tape can be replaced readily and simultaneously.

8 Claims, 4 Drawing Figures

MEASURING AND RECORDING DEVICE FOR MONITORING VIBRATIONS CAUSED BY BLASTING

The present invention relates to a measuring and recording device comprising one or more transducers wired in an input circuit and set up to detect vibrations, whereby mechanical movement is converted into electric signals which, after further processing in the input circuit, are transmitted to an analog/digital converter so designed that it, and a time signalling circuit, may be read by a sensor to permit the recording of the information on a recording medium by an output device.

The new measuring and recording device is primarily designed to serve as an essential part of a system for measuring, recording and evaluating blast vibrations at specified points in a building. Hence the device is especially intended to be used in cases where blast vibrations are to be recorded, at one or a few points, in fulfillment of requirements laid down by authorities and insurance companies.

One of the principal objects of the invention is to make available a measuring and recording device of the type described which need not be connected to a main electrical system, but will still possess satisfactory measurement and recording capacity for a comparatively long period. Hence the device must be battery-powered, and it must be easily set up and serviced.

A further object to be met by the new device is that it shall be possible by a simple procedure to read off the most recently recorded measurement without having to disassemble or open the device.

It shall be possible to evaluate or read out records produced by the new measuring and recording device by means of an automatic evaluating device, preferably stationed at a centrally located evaluating office. However, it must be possible to carry out non-automatic evaluation and reading either at the actual point of measurement—sometimes necessary to save time—or at the centrally located evaluating office.

A measuring and recording device of the type mentioned, which meets the principal requirements above and which can be designed to fulfill other functions as well, is primarily characterized, according to the invention, in that a circuit comprising a regulated voltage source in series with a comparator unit is set up between an input circuit and an analog/digital converter so that the voltage source supplies energy continuously to the input circuit and the comparator unit only, and that the comparator unit is designed upon receiving a signal of magnitude exceeding a pre-set threshold to trigger the voltage source so that the latter intermittently powers a sequence generator designed to activate and control both the analog/digital converter and a sensor. Thus, under normal operating conditions—that is, at times other than during blasting—the main voltage source of the measuring and recording device energizes only the input circuit and the comparator, which use little power, with the result that the power consumption can be kept very low. When blast vibrations exceed a pre-set threshold value, however, the regulated voltage source also temporarily energizes those units of the device that draw a greater amount of power; but since these units are only switched on for a short time, the total working life of the voltage source will be long even if quite small batteries are used.

Inasmuch as the medium for recording information and the main battery for powering the device are both housed in the same replaceable cartridge, the measuring and recording device is easily serviced. Thus, at the same time the battery is changed, the recording medium—normally a paper tape reel—is changed also.

The invention is described in greater detail below in the form of an exemplary embodiment. The following description refers also to the accompanying drawings, wherein.

Figure 1:
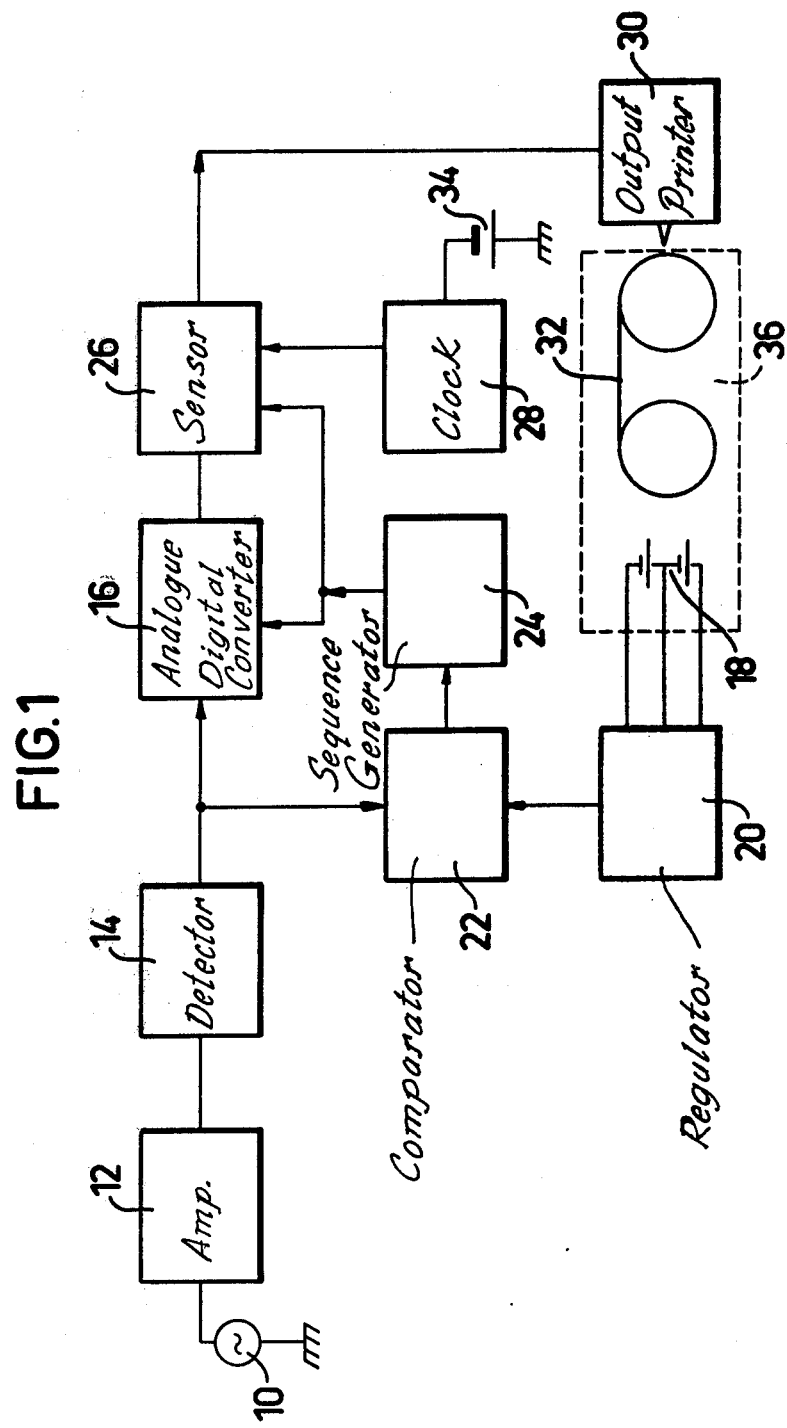
FIG. 1 is a block diagram showing the hook-up of the electrical components of one embodiment of the new measuring and recording device.

The schematic block diagram in FIG. 1 shows only one transducer device 10, which may be, for example, a geophone. The transducer 10 forms part of an input circuit comprising also, in series therewith, an amplification stage 12 and a detection stage 14. The amplification stage 12 amplifies the input signal it receives and also effects frequency compensation. Since the sensitivity of different transducers varies, this stage also effects an equalization, ensuring that the output signal of the amplification stage 12 is always the same for a given rate of vibration. The detection stage 14, comprising a peak detector with short-term store, effects full-wave rectification and retains the peak values of the input signals for a certain time to enable a following analog/digital converter 16 to carry out the required signal conversion.

In parallel with the input circuit described above there is another circuit consisting of a regulated voltage source 18, 20 in series with a comparator stage 22. The regulated voltage source comprises a main battery 18 for powering the device and, associated therewith, a battery regulator 20 which controls the battery in a manner dependent on the output of the comparator stage 22. Normally, i.e. when no blast vibrations are being received, only the input circuit 10, 12, 14 and the comparator stage 22 are connected to the regulated voltage source 18, 20. The comparator stage 22 is designed, upon receiving an input signal of magnitude exceeding a pre-set threshold value, to act upon the regulated voltage source, thus causing the latter intermittently to power a sequence generator 24 connected to the comparator stage 22. The sequence generator 24, in turn, is designed to control the analog/digital converter 16 and also a sensor 26 in the form of a code converter, set up in order to read the analog/digital converter 16, and an independently powered time signaling or clock circuit 28, thus triggering an output device 30 which records the desired information in a known manner on a paper tape 32 equipped with forward feed.

The time signaling circuit 28 consists of a conventional integrated circuit that indicates hours and minutes, plus one counter each for days and weeks. The time indicator circuit 28, which has very low power consumption (comparable to that of a digital wristwatch), is powered by a separate battery 34 that is permanently on. The operating life of this battery 34 is at least one year, and the time circuit need not be reset except when a new battery is inserted.

As suggested by the dashed rectangle in FIG. 1, the main battery 18 and the paper tape 32 of the measuring and recording device are housed in a common cartridge 36. The cartridge is easily changed, permitting simultaneous replacement of both the battery and the paper tape. The battery 18 incorporated in the cartridge 36 is sufficient for normal operation for a period of approximately two to four weeks, and the paper tape reel 32 will hold about 100 records. The cartridge 36 is removed from the measuring and recording device by pulling it straight out and is replaced by pushing it in, whereafter it is fixed in position by closing a door, which is hinged as at 39 to the front of the measuring and recording device (FIG. 2).

Figure 2:
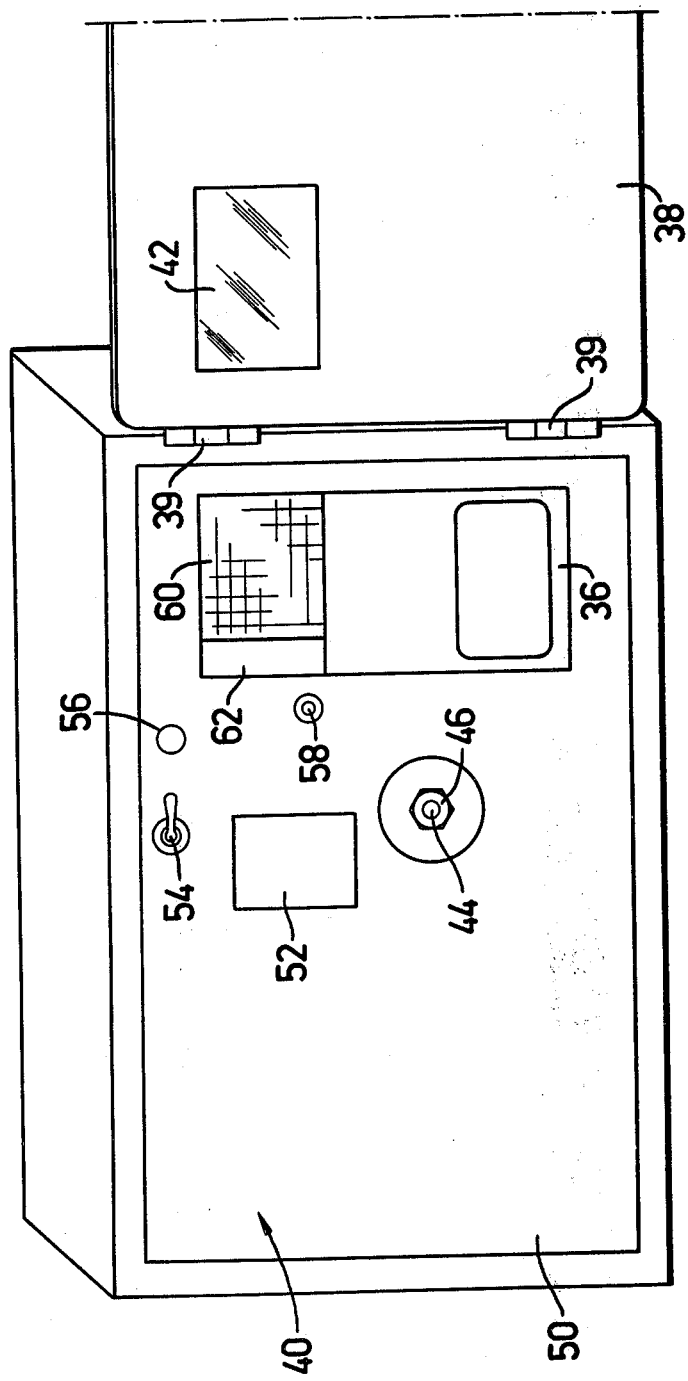
FIG. 2 is a perspective view showing the outside of this new measuring and recording device, with a door on the front of the device shown fragmentarily and in its opened position.

As is apparent from FIG. 2, the new measuring and recording device can appropriately be housed in a box 40. Its above-mentioned door 38, which can be closed and locked, is provided with a transparent window 42 through which the most recent measurement record can be read. Although not specially indicated in the drawing, the rear of the box 40 includes a transducer package from which the other, sensitive components housed in the box may be shielded by means of a diaphragm (not shown) of vibration-absorbing material, such as rubber. If desired, the electronic components described above may be embedded in epoxy resin or silicone rubber, which affords further protection against vibration and also against variations in weather conditions, including humidity. Along with the transducer package and the said electronic unit, the combined battery and recording cartridge 36 also constitutes one of the major components of the measuring and recording device.

Figure 3:
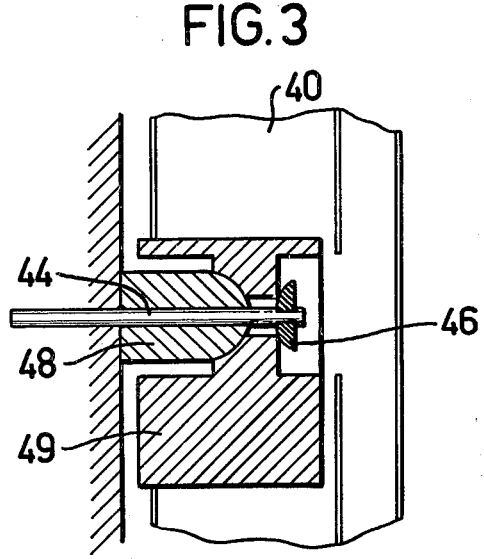
FIG. 3 is a fragmentary side elevational view of the device showing in section an especially suitable mounting means for fixing the new measuring and recording device at the point of measurement on the wall of a building.

The complete device is mounted on a support at the point of measurement by means of a screw 44 (FIG. 3), which is secured at its inner end in the support and projects at its opposite end through members 48 and 49. Member 49, which is fixed in box 40 to register with an opening in the rear wall thereof, is fastened by a nut 46 to the outer end of screw 44 and has a socket in its inner end seated on the rounded outer end of member 48. The device can be adjusted to horizontal position by means of the ball-and-socket joint between members 48 and 49, and the nut 46 can then finally be tightened to fix the device in the position in which it has been set. A level 52 located on the front panel 50 behind the door 38 of the device is used to check the correctness of the positional setting. On the front panel 50 there are also three controls, namely, an on/off switch 54, a calibrating button 56 and a range selector 58.

The on/off switch 54 is used for switching on and off the main battery 18 of the device. When switched off, the switch 54 also protects the transducers against impact damage during transport by short-circuiting their current coils (not illustrated).

When the calibrating button 56 is pressed, the input side of the device is connected to an internal calibration voltage, thus initiating a record of the time and the measured magnitude. The device may be calibrated after mounting at the point of measurement but before being put into operation. Calibration provides a check of the component that processes the measurement signal, and also of the time signaling circuit and the recording unit. Calibration records are identified on the paper tape by a special code.

The range selector 58 is used to select the desired range, and is designed to be adjusted by means of a screw driver to avoid accidental alteration of the range setting. A scale disc is mounted on the selector shaft so that the selected measurement range is indicated in the window with the paper tape 32. The range setting is also indicated by a special code in the record.

Figure 4:
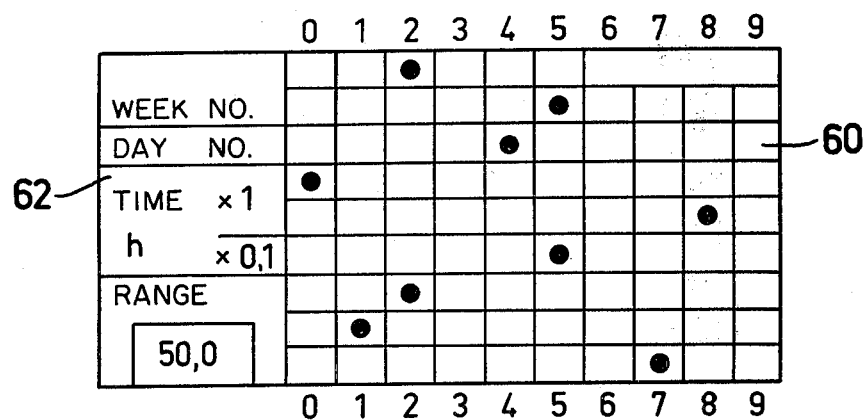
FIG. 4 shows part of a paper tape upon which information is recorded by this device, and part of the front panel thereof which bears information for interpreting the record.

As shown in FIG. 4, the pattern 60 formed by the measurements recorded on tape 32 is visible through the window 42 in the door 38. This FIG. also shows the key or information 62 provided on the front panel 50 for identifying the nature of the recorded data. As is apparent from FIG. 4, the time is indicated by the week number, day number, hours from 0 to 23, and tenths of an hour. The measured magnitude is indicated by three digits, each digit within the measurement range being denoted by a dot in one of the positions 0–9 in the row in question. The window 42 in front of the recording paper tape is provided with a grid to facilitate reading. The measurement range in use is indicated next to the measurement.

The above description of the new measuring and recording device explains only the case where a single transducer is used. It is, however, naturally possible to use more than one transducer, for example, three. In such a case, the transducers will be wired up in parallel branch circuits, each branch having its own amplification stage. When more than one transducer is used, it is also necessary to provide a separate computing circuit, which may be connected between the amplification stage and the detection stage. Otherwise, the circuit arrangement is wholly analogous to that described above.

It should be evident that the measuring and recording device discussed above can be modified within the terms of the idea of the invention as presented in the claims.

Having thus described my invention, what I claim is:

1. In a measuring and recording device having at least one transducer in an input circuit and set to detect vibrations, whereby mechanical movement detected by said transducer is converted into electric signals, which, after further processing in the input circuit, are transmitted to an analog/digital converter so designed that it and a time signaling circuit may be read by a sensor to permit the recording on a recording medium of the information embodied in the processed signals received from said input circuit, a further circuit comprising a regulated voltage source and a voltage comparator unit connected in series between said input circuit and said analog/digital converter so that the voltage source supplies energy continuously to the input circuit, and to the voltage comparator unit only, and a sequence generator having an input connected to the output of said comparator unit, and an output connected to said converter and to said sensor, said comparator unit being connected to said output circuit and being operative, upon receiving from said input circuit a processed signal of a magnitude exceeding a pre-set threshold value, to trigger the regulated voltage source so that the latter intermittently powers said sequence generator, which functions to activate and control both said analog/digital converter and said sensor.

2. A device as defined in claim 1, wherein said sensor comprises a code converter and said regulated voltage source comprises a battery unit and a battery regulator associated therewith.

3. A device as defined in claim 2, wherein said recording medium and said battery unit are housed in said device in a common, replaceable cartridge.

4. A device as defined in claim 3 wherein said recording medium comprises a reel of paper tape.

5. A device as defined in claim 1, wherein a separate voltage source is provided to supply power continuously to said time signaling circuit.

6. A device as defined in claim 1, wherein said input circuit comprises, in series, a transducer device such as a geophone, an amplifier, and a peak signal detector having short-term signal storage capability.

7. A device as defined in claim 1, wherein said input circuit comprises a plurality of branch circuits connected in parallel, each of said branch circuits including a transducer device such as a geophone in series with an amplifier, a computing circuit, and a peak signal detector having short-term signal storage capacity.

8. A device as defined in claim 4, wherein said cartridge is so arranged in said device as to allow inspection of a portion of said paper tape without it being necessary to open the device.

* * * * *